UNITED STATES PATENT OFFICE 2,382,398

TRANSPARENT MIXTURE

Tulio Cordero, West Roxbury, Mass., assignor to United-Rexall Drug Company, a corporation of Delaware No Drawing. Application February 18, 1942, Serial No. 431,367

2 Claims. (Cl. 252—312)

This invention relates to transparent mixtures, and more particularly to transparent mixtures of oil and water.

Among the objects of this invention are the provision of transparent mixtures of the type indicated; the provision of mixtures of the class indicated which are stable over a substantial period of time; and the provision of mixtures of the type described which may be readily prepared from easily available materials and which are compatible with substances soluble in either of the ingredients. Other objects will be in part apparent and in part pointed out hereinafter.

The invention accordingly comprises the ingredients and combinations of ingredients, the proportions thereof, steps and sequence of steps, and features of composition and manipulation, which will be exemplified in the products and methods hereinafter described, and the scope of the application of which will be indicated in the following claims.

Referring to the present invention, it has been found that transparent mixtures of oils and water can be prepared from oil and water solutions having different indices of refraction. Such mixtures are of the solution type, and remain clear over long periods of time.

The mixtures of the present invention are prepared by mixing together an oil and water, each of which has dissolved therein the anhydride of an esterified hexahydric alcohol.

The preferred hexahydric alcohol ester anhydrides are the monolaurates of the sorbitans and the modified monolaurates of mannitans. Such modified mannitan monolaurates are condensation products with ethylene oxide. A type formula for a modified 1,4 mannitan monolaurate, which may form one of the ingredients, is as follows:

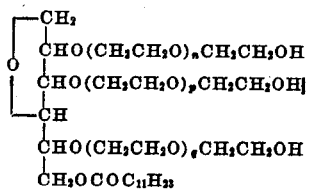

The sum of $n+p+q=20$ in this formula. Mixtures of the various isomers of the mannitan and sorbitan esters are suitable for carrying out the present invention, and because of their ready availability are the preferred materials.

The preferred oil component is a mixture of a deodorized, highly refined light petroleum distillate, and a paraffin oil, although a straight paraffin oil may be substituted if desired.

In the preferred embodiment of the present invention, a sorbitan ester is dissolved in the oil fraction and a modified mannitan ester, because of its higher water solubility, is dissolved in the water component.

The following examples, in which all parts are by weight, illustrate the invention.

Example 1

12 parts of sorbitan monolaurate, consisting of a mixture of the monolaurate esters of sorbitan, are mixed with 45 parts of deodorized light petroleum distillate and 5 parts of light mineral oil. 19 parts of a modified mannitan monolaurate, consisting of a mixture of mannitan esters, are separately mixed with 19 parts of water. The mannitan-water mixture is then added to the sorbitan-oil mixture, and mixing is continued. The mixture becomes thin and cloudy and then becomes thick and clear, forming a homogeneous, transparent product. This transparent mixture is obtained even though the refractive index of the oil-sorbitan mixture was 1.4404 and the refractive index of the mannitan-water mixture was 1.4054.

Example 2

A mixture of 32 parts sorbitan monolaurate and 30 parts of light mineral oil or paraffin oil is made. To this mixture is then added the mixture of modified mannitan monolaurate and water described in Example 1. A clear, transparent mixture is obtained.

Example 3

A mixture is made of 10 parts of light mineral oil or paraffin oil and 12 parts of sorbitan monolaurate. To this mixture is added a mixture of 59 parts of modified mannitan monolaurate and 19 parts of water. A clear, transparent mixture is obtained.

Example 4

A mixture similar to that of Example 3 is made, except that the light mineral or paraffin oil is replaced with a mixture of 9 parts of deodorized light petroleum distillate and 1 part of light mineral oil. A clear, transparent mixture is obtained.

Example 5

A mixture of mineral oil and sorbitan monolaurate is made as described in Example 3, and to this mixture is added a mixture of 39 parts of modified mannitan monolaurate and 39 parts of water. A clear, transparent mixture is obtained.

Example 6

A mixture of oil and sorbitan monolaurate is prepared as described in Example 3. To this mixture is added a mixture of 29 parts of modified mannitan monolaurate and 49 parts of water. A clear, transparent mixture is obtained.

Example 7

A mixture is formed of 40 parts of an oil fraction composed of 90% deodorized refined light petroleum distillate and 10% paraffin oil, and 12 parts by weight of sorbitan monolaurate. To this mixture is added a mixture of 29 parts of modified mannitan monolaurate and 19 parts of water. A clear, transparent mixture is obtained.

Example 8

A mixture of 30 parts of the oil fraction of Example 7 and 12 parts of sorbitan monolaurate is formed. To this mixture is added a mixture of 39 parts of modified mannitan monolaurate and 19 parts of water. A clear, transparent mixture is obtained.

Example 9

A mixture of 20 parts of an oil fraction having the composition set forth in Example 7 and 12 parts of sorbitan monolaurate is formed. To this mixture is added a mixture of 49 parts of modified mannitan monolaurate and 19 parts of water. A clear, transparent mixture is obtained.

The clear, transparent mixtures obtained in the foregoing examples appear to be colloidal solutions. Although the ingredients have different indices of refraction, a clear mixture is obtained.

It will be noted that the proportions of the various ingredients may be varied widely. The order of mixing of various ingredients may also be changed. In all instances, however, the various ingredients should be thoroughly intermixed.

The clear, transparent mixtures of the present invention may be utilized for many different purposes. They form excellent bases for a hair dressing, for a lotion, and for other purposes for which a clear, transparent mixture of oil and water is desired. Additional ingredients may be incorporated into the present mixture as long as each ingredient is compatible with a component of the mixture. For example, a hair dressing may be made from such a base by the addition of ingredients such as perfumes, preservatives, or other materials having special purposes.

In general, the mixtures of the present invention may be diluted with a substantial proportion of water or of oil after their formation, without causing the mixture to lose its clear, transparent properties.

Attention is directed to my copending application, Serial No. 560,909, filed October 28, 1944.

In view of the above, it will be seen that the several objects of the invention are achieved and other advantageous results attained.

As many changes could be made in the above methods and products without departing from the scope of the invention, it is intended that all matter contained in the above description shall be interpreted as illustrative and not in a limiting sense.

I claim:

1. A clear, transparent mixture of an oil, water, a sorbitan monolaurate, and a condensation product of mannitan monolaurate with ethylene oxide.

2. A clear, transparent mixture of mineral oil, water, a sorbitan monolaurate, and a condensation product of mannitan monolaurate with ethylene oxide.

TULIO CORDERO.